United States Patent [19]

Siahpolo et al.

[11] Patent Number: 5,481,431
[45] Date of Patent: Jan. 2, 1996

[54] SYSTEM HAVING U-SHAPED ACTUATOR AND HANDLE WITH CAM SURFACES FOR MOUNTING COMPUTER HARD DRIVE OR THE LIKE

[75] Inventors: Hassan Siahpolo, Campbell, Calif.; Robert S. Antonuccio, Burlington; James M. Carney, Pepperel, both of Mass.; Daniel F. Hoornaert, Mountain View, Calif.; Joseph M. Spano, North Reading, Mass.

[73] Assignee: Sun Microsystems, Inc., Mountain View, Calif.

[21] Appl. No.: 187,991

[22] Filed: Jan. 28, 1994

[51] Int. Cl.[6] ............... G06F 1/16; H05K 7/10; H01R 13/62
[52] U.S. Cl. ............. 361/685; 361/726; 439/160
[58] Field of Search ............... 312/310, 332.1; 439/152, 153, 157, 159, 160, 540, 928, 540.1; 360/137; 364/708.1; 361/683–685, 724–727, 740, 747, 756, 759, 801

[56] References Cited

U.S. PATENT DOCUMENTS

| | | |
|---|---|---|
| 2,609,268 | 9/1952 | Nye .................... 439/157 X |
| 4,754,397 | 6/1988 | Varaiya et al. ............. 361/685 |
| 5,262,923 | 11/1993 | Batta et al. ............... 361/685 |

*Primary Examiner*—Michael W. Phillips
*Attorney, Agent, or Firm*—Matthew C. Rainey

[57] ABSTRACT

The disclosed invention relates to a computer system, including a crib device and chassis and including a U-shaped actuator and handle with distinct cam surfaces for installing and removing a hard drive to and from the chassis of the system. The drive is securable to the crib device, which has a handle that allows the drive to be carried to and away from the chassis. The crib device and chassis have cams and cam engaging surfaces that cause the crib device and drive to move to effect engagement and disengagement of the electrical connectors of the computer system and drive.

40 Claims, 6 Drawing Sheets

5,481,431

SYSTEM HAVING U-SHAPED ACTUATOR AND HANDLE WITH CAM SURFACES FOR MOUNTING COMPUTER HARD DRIVE OR THE LIKE

BACKGROUND OF THE INVENTION

The present invention relates to an improved computer system, including an arrangement that allows the safe, quick and effortless installation, engagement, disengagement and removal of a hard drive or the like of the system and a method of manufacturing the arrangement and the assembly of the system and the devices thereof.

In most, if not all, computer systems, where space is always a high priority, the handling of the relatively heavy hard drive is a serious problem requiring great care to avoid damaging the drive, both in the initial installation thereof and in the later performance of maintenance. This is particularly true in the critical handling and positioning of the drive for electrical connection to the computer system. Because hard drives can not be subject to any great amount of stress or shock, it is highly desirable to find a way to safely handle the drives when installing them and in their removal from the computer systems. In the past, the heavy very expensive hard drives have been handled by hand and fastened to the computer chassis by hand tool tightened screws.

Another important consideration in installing and removing the drive is to find a way that allows the use of a slotted or plug-in electrical connection system, wherein the drive can be connected to the system without the need of the use of hands or tools, or the extra step or steps represented thereby. Also, in past designs, the connection of the drive in a slotted or plug-in design required a considerable force to effect the electrical connection and disconnection, which in many cases because of the location of the drive in the computer system made it very difficult and time consuming to apply the necessary force required to effect the connection and disconnection.

Any device or system that answers these objectives should be low in cost and high in reliability, in addition to reducing the number of required parts and reducing the installation and removal time and cost.

BRIEF DESCRIPTION OF THE INVENTION

The present invention meets each of the aforesaid requirements by providing an improved computer system, including a user friendly crib arrangement for installing a hard drive element or the like of a computer system. The crib arrangement allows the safe, quick and effortless installing and, if desired, removal of an element to and from the system and one that allows the use of an electrical plug-in connector, where no tool force and very little hand force is required to effect the electrical connection and where the required force is applied in a very convenient manner.

More particularly, the invention provides an improved computer system, including a crib device and a method of manufacture and assemblage designed to be received in a chassis of the computer, the chassis having elongated openings that receive holding and guiding elements provided on the crib device. The openings also provide a mechanical mechanism, such as for example, cam engaging surfaces adapted to be contacted by cams of the crib device; through which action the crib device and a hard drive that has been secured thereto can be moved in reverse directions by an actuator that may take the form of a handle to which the cams are made a part; the leverage effect of the handle and cams providing the required force to engage and disengage the drive to and from a slotted connector with very little effort. The employment of a handle in this manner allows for the safe, quick and inexpensive handling of the hard drive to and from the chassis and the ability to connect and disconnect the electrical connection with a minimum of hand force and without any need to use tools.

BRIEF DESCRIPTION OF THE DRAWINGS

These objects, and as well as other features and advantages of the invention will be better understood when the following description of a preferred embodiment of the invention is read along with the accompanying drawings of which.

DETAIL DESCRIPTION OF THE INVENTION

Figure 1:
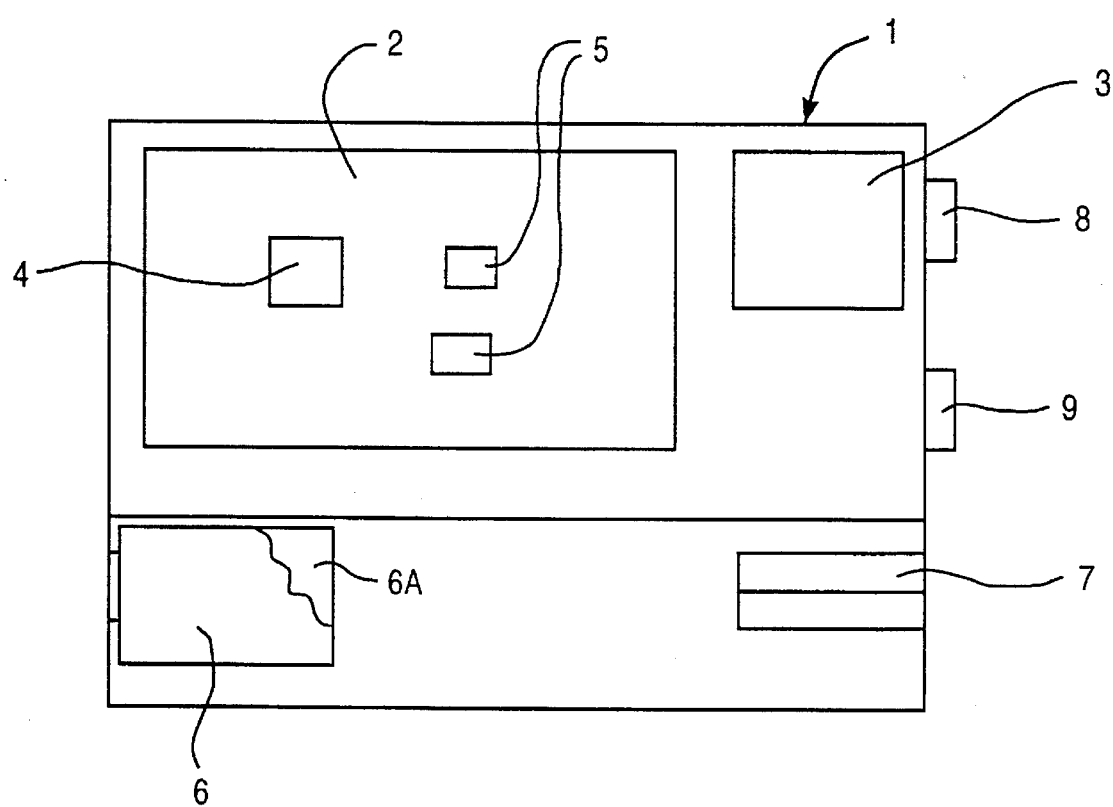
FIG. 1 is a schematic plan view, with the top part removed, of an improved computer system incorporating a crib device according to the present invention.

With reference to FIG. 1, there is illustrated in outline form an improved computer system according to the present invention, including along with other customary components and circuits, a computer box 1, a motherboard 2, a power supply unit 3, a CPU unit 4, two memory units 5, hard drive 6 having a printed circuit board 6A, a floppy disk drive 7 and input and output facilities 8 and 9, all these units being well known in the art.

Figure 2:
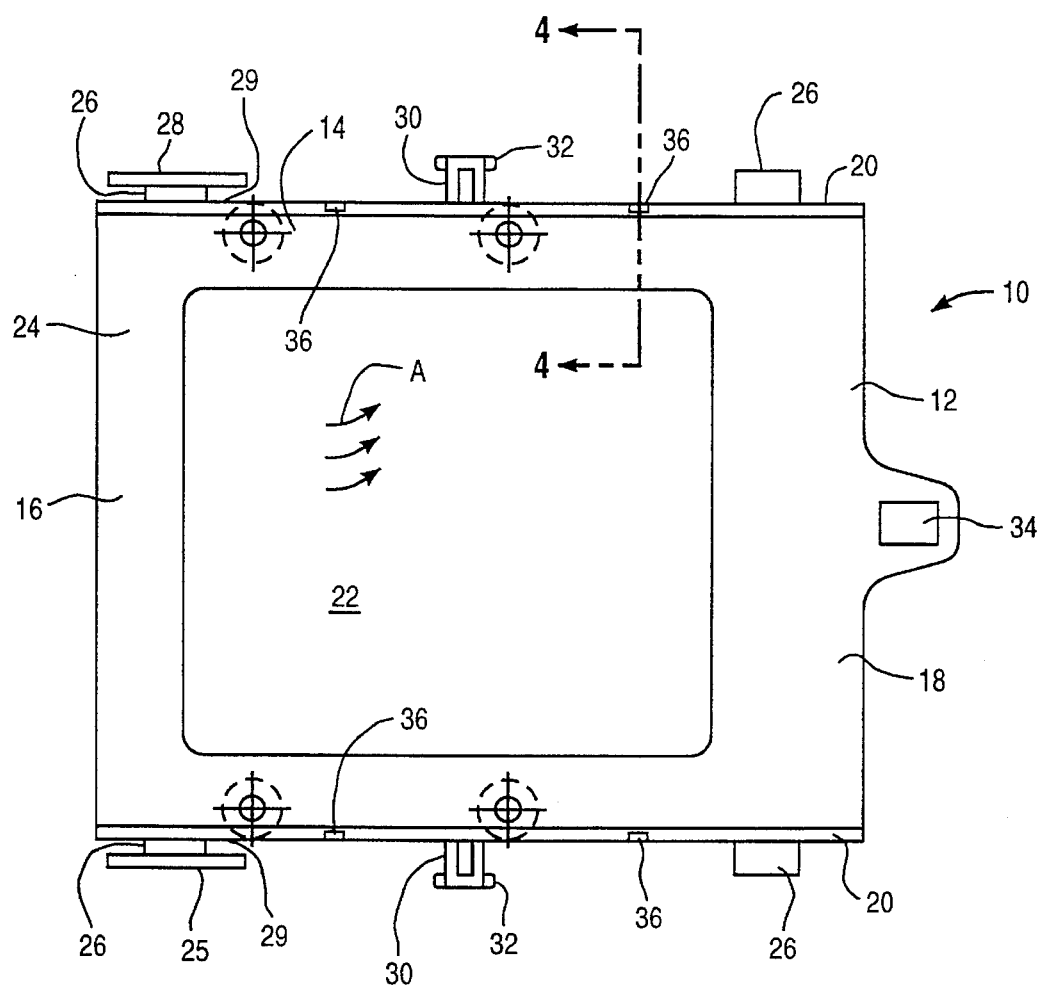
FIG. 2 is a plan view of a crib device illustrating the base portion thereof without its handle.
Figure 3:
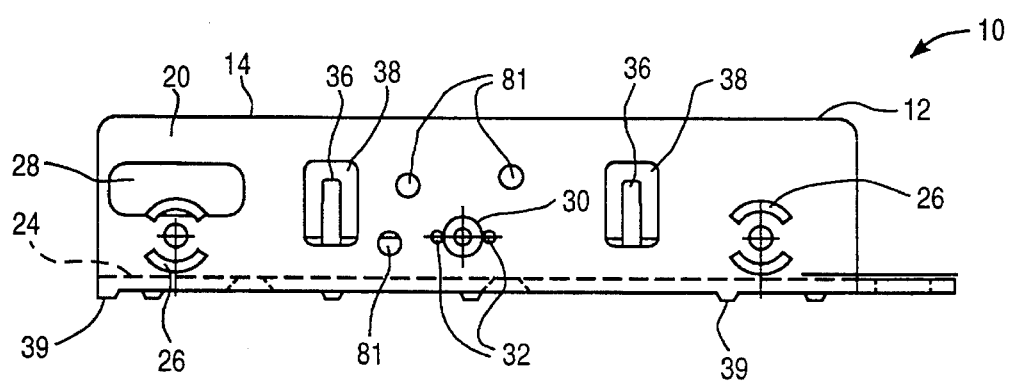
FIG. 3 is an elevational view of the base portion shown in FIG. 2.
Figure 4:
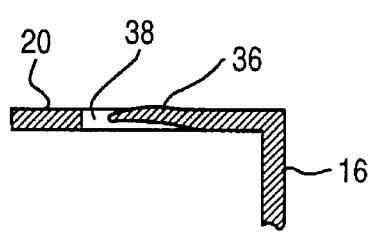
FIG. 4 is a section view taken on line 4—4 of FIG. 2.

The system includes a crib device 10 illustrated best in FIGS. 2, 3 and 4. The crib device 10 consist of a generally rectangularly shaped box 12 having, as one views FIGS. 2 and 3, an open top 14 and two opposed open ends 16 and 18. On the two longitudinal sides of the box 12 there are provided identical upright members or walls 20 that extend the full length of the box. The substantial opening 22 formed in the bottom 24 of the box is provided to reduce its weight and allow air flow cooling access for the bottom of the hard drive, the air flow being indicated by the legend A in FIG. 2. As noted above, the bottom of the hard drive has a customary printed circuit board 6A with its usual electrical components.

On the outside of each upright member 20 there are formed two spaced apart support and retention members 26 shaped, as best shown in FIG. 3, as segments of cylinders with the segments being arranged at the top and bottom and separated by spaces at the 3 and 9 o'clock positions. The members 26 are located near the ends 16 and 18 of the box 12. The members 26 at the end 16 of the box 12 is provided with brackets 28 that are mounted on the outer ends of the associated two members 26 to form spaces 29 between the adjacent portions of the upright members 20. As noted in FIGS. 2 and 3, the brackets extend parallel to the upright members 20 on either side of the support members 26.

Midway between the ends 16 and 18 on the outside of the walls 20 there are formed two in line spaced apart trunnion members 30 having cylindrical portions that project outwardly from the associated walls. The outer ends of the trunnion members 30 are provided with two diametrically oppositely arranged narrow projections 32. At the end 18 of the box 12 formed in the bottom 24 is a latch opening 34. The two walls 20 of the box 12 are provided with deflectable fingers 36, best shown in FIGS. 3 and 4. To form these fingers the walls 20 are provided with upright rectangular openings 38 with portions of the walls unremoved extending from the lower ends of the openings and terminating short of the upper ends of the openings, thus forming the upwardly extending fingers 36. As best shown in FIG. 4, portions of the outer surfaces of the fingers 36 project beyond the adjacent surfaces of the walls 20 of the box 12, allowing the fingers 36 to be deflected inwardly when contacted by outside surfaces.

In referring to FIG. 3, on the outside surface of the bottom 24 below the walls 20 and at the very end on the left, as one views this figure, and inward from the opposite end, there are provided four feet 39, two being shown in FIG. 3. These feet provide frictional reducing sliding surfaces, as will be noted below, and aid in air flow for cooling the hard drive by providing a space between the floor 65 of the chassis or a crib device arranged below. It will be obvious to a skilled person in the art that the box 12 may take other forms, for example, a simpler form than described above, such as consisting of a single base member.

Figure 5:
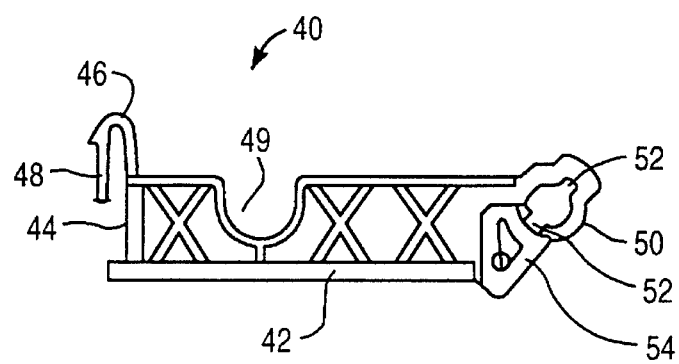
FIG. 5 is a plan view of a handle used but shown apart from the base portion of the crib device shown in FIGS. 2 and 3.
Figure 6:
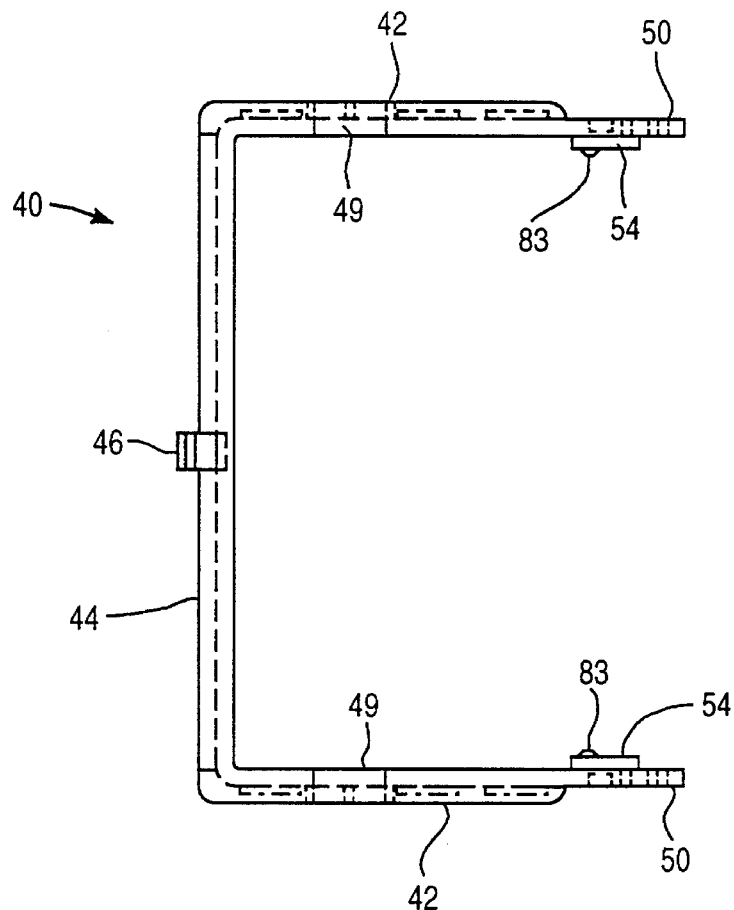
FIG. 6 is an elevational view of the handle shown in FIG. 5.

With reference now to the handle that is attached to the box 12, reference is made to FIGS. 5 and 6. The handle 40 consist of two identical arms 42 which are connected at their one ends by a cross member 44, which cross member at its upper surface is provided with a latch 46 in the form of an inverted U shaped member having an outer free collapsible end 48. Also at the latch end of the arms 42, the arms have circular, recesses 49 facing the bottom of the arms designed to pass over adjacent support members 26 of the box 12. At the extreme inner ends of each arm, the arms are provided with bosses 50 having openings that slide over the trunnion members 30 of the box 12, the bosses each having diametrically opposite slots 52 that slide over the projections 32 of the box 12. By this construction, the handle 40 is pivotally connected to the box and allowed to rotate from an upright carrying position, to a horizontal latching position and to two positions on either side of the carrying position, which are designated the forward and rearward crib device moving positions.

The distance of the separation of the arms 42 and the axial dimension of the bosses 50 are such that the inside of the arms are separated from the walls 20 of the box 12 sufficient to allow cam elements 54 to be arranged inside the arms 42 and the vertical outside surfaces of the walls 20. In this construction, while the handle 40 is free to rotate there will exist no play or transverse movement of the handle relative to the box 12 due to the restraining action of the fingers 36. The two cam elements 54 are identically formed in the general shape of a triangle, in which when the handle 40 is in its vertical most position, i.e. its carrying position, the cam elements 54 present two upper rounded cam surfaces 56 separated by one of the sides of the triangle, these surfaces being better shown in FIGS. 7 and 8. The cam surfaces 56 form first parts of two cam mechanisms.

It will be appreciated that while two cam elements are employed in the preferred embodiment, if desired, a single cam element 54 may be employed. It will also be apparent to those skilled in the art that other forms of an actuator can be used instead of the handle design illustrated, for example, a single lever arranged in several different ways can be used. As will be more apparent later, the leverage effect of the throw of the cam elements 54 and the length of the arms 42 are designed to allow the effortless movement of the crib device 10 when engaging and disengaging the hard drive, two such drives being shown only in FIGS. 7 and 8 at 6 and 6A.

The box 12 is dimensioned to permit the placement of a standard hard drive into the box 12 where it may be secured to the box by either screwless fastening facilities or by screws. In the design being illustrated, a hard drive lying flat against the bottom 24 of the box 12 is secured to the crib device 10 by four screws 58 passed through openings provided in the support and retention members 26 and into cooperative threaded holes, not shown, in the hard drive, two of the screws being shown only in FIG. 7. With other hard drives the screw connection may be made from the bottom of the drive or the drive may be secured to the crib device in some other manner. The crib device being illustrated is designed for a hard drive measuring approximately 5¾"× 3¾"×1", which as noted above may be considered one of several standard sizes of drives in use today in desk top computer systems. While the invention for illustration purposes is used with a hard drive, it will be appreciated that the crib device may be employed to handle other elements of the computer system, such as a floppy disk drive.

The crib device 10 described above is designed to be made out of a polymer material, although it can be made of metal, such as an aluminum alloy. The choice of the material will depend on cost, environment, ergonomic and performance considerations.

Figure 7:
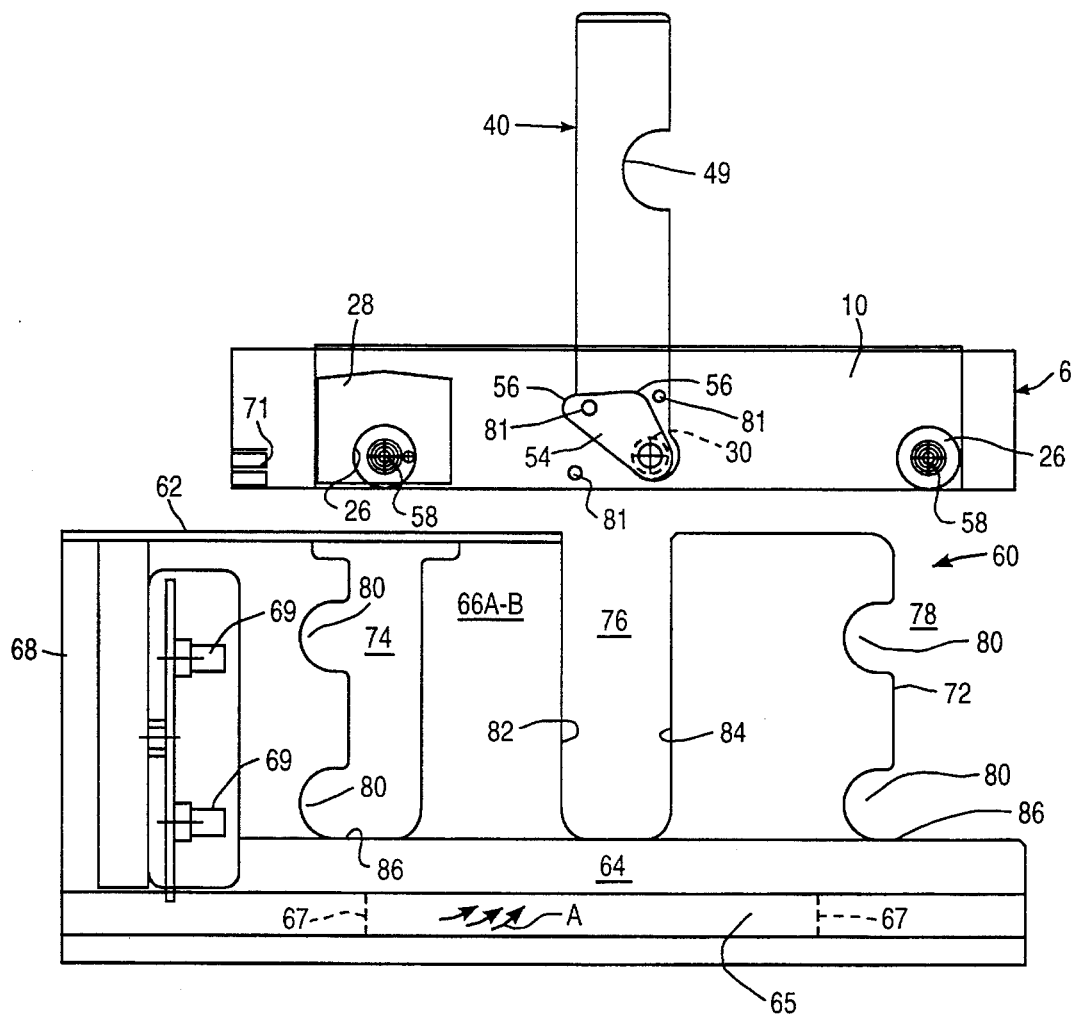
FIG. 7 is an elevational view, simplified in certain respects, of a chassis of a computer system illustrating a crib device and hard drive supportable by the handle above the chassis in position to be lowered into the chassis, and FIGS. 8, A, B, C and D, are four schematic elevational views illustrating four related, but different, positions assumed by the crib device relative to the chassis of a computer system, in installing the crib device with a hard drive in the chassis and moving the drive into a slotted electrically connecting position.

In referring now to the chassis 60 designed to cooperate with the crib device 10, reference is made to FIGS. 7 and 8A–8D. Particularly in FIG. 7, there is illustrated a chassis 60, which while only one side and a portion of its back wall are shown, it will be understood that the chassis takes the form of a box like structure that makes up a small part of the composite computer box or chassis. The chassis 60 has an open top 62, a bottom 64, which is joined and supports two upright walls 66A, one of which is only shown but the other indicated as 66B in the figures. The bottom 64 includes a flat sheet metal floor 65, which is provided with an opening, indicated by surfaces 67 shown in FIG. 7, located below the opening 22 of the crib device 10 and sized to allow air flow cooling of the hard drive, the air flow being indicated by the legend A in FIG. 6. One end of the chassis has a back wall 68 on which a slotted or plug-in electrical connector 69 is mounted and over and into which the matching connector 71 of the hard drive 6 is forced into. These connectors are of the type well known in the computer industry. In FIG. 7, two electrical connectors 69 are shown. The opposite end 72 of the chassis is open.

Figure 8A:
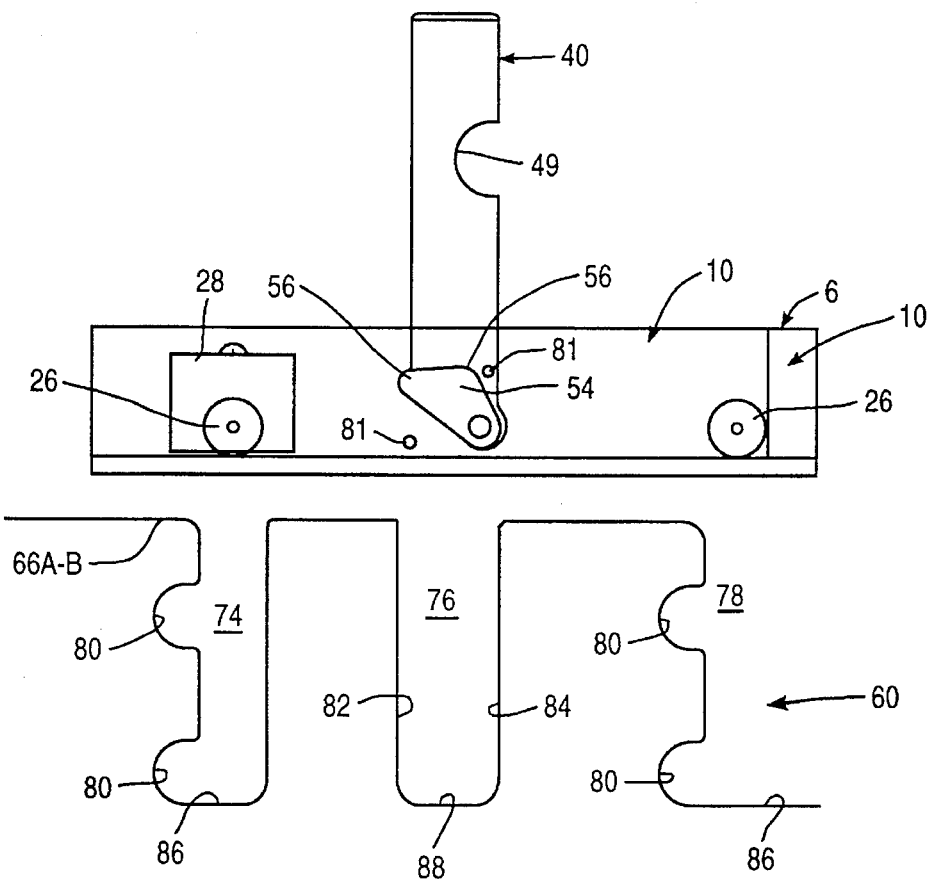
Figure 8B:
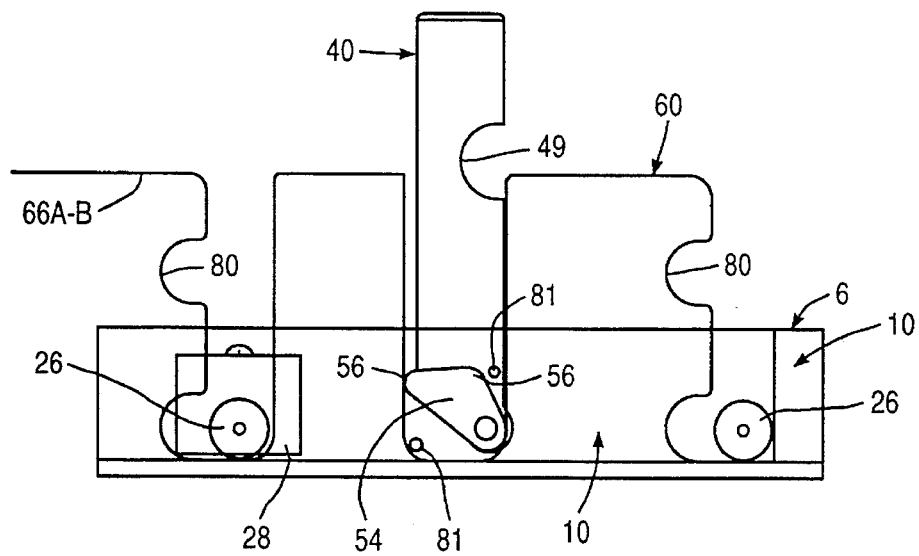

As best shown in FIG. 8A, each side of the walls 66, A and B which are identically constructed, have three vertically arranged openings, 74, 76, and 78, reading left to right, the openings 74 and 78 each have a set of two vertically spaced recesses 80, the lower and upper recesses of one set being in horizontal alignment and sized to loosely receive the support and retention members 26. This alignment assures that the electrical connector of the hard drive will be on the proper plane for registry with the electrical connector of the computer system. The openings 78 in both walls 66A and B are actually formed by the open end of the chassis 60. The openings 76 in the walls 66A and B have straight vertical cam contacting cooperating sides or surfaces 82 and 84 that form second parts of the two cam mechanisms. While in the preferred form, the cams are formed on the cam elements 54, they may be formed on the chassis 60, in which case they would engage straight surfaces formed on the handle 40.

The openings 74 and 78 have bottom supporting edges 86, (see FIGS. 7 and 8A) and are contacted in a supporting relationship with the retention members 26, while the bottoms of the openings 76 are held out of contact with the bottoms of the trunnions 30 of the box 12 due to their smaller outside diameters relative to the trunnions 30. As is customary, the chassis is formed out of relatively heavy gauge steel sheet metal.

As shown in FIG. 3, the front wall 20 of the box 12 of the crib device 10 is provided with three holes 81 arranged on a common arc. The back wall 20 is provided with only two similar holes corresponding to the two upper most holes 81. As shown in FIG. 6, on the inside vertical surface of both of the cam elements 54 there are provided projecting buttons 83 arranged to pass through the aforesaid arc. The lower most single hole 81 when entered into by the button 83 is used to register the projections 32 of the trunnions 30 with the openings 52 of the arms 42, to aid in the assembly of the handle 40 on the trunnions 30 of the box 12. The holes 81 at the 11 o'clock position, as one views FIG. 3, are provided to hold the handle 40 in its carrying and inserting and removing positions, when they receive the buttons 83 to assist in the quick and easy installing and removing of the crib device and hard drive. The remaining holes 81 are provided to relieve any stress on the handle 40 that may occur when the handle is latched due to the stress placed on the handle by the latching action.

In briefly describing the operation of the improved computer system, including the crib device 10 and chassis 60 and their assemblage, with the top, not shown, of the computer system removed allowing immediate access to the hard drive chassis 60, a crib device 10 is inserted into the openings 76 of the chassis. Before this is done, a hard drive 6 will have been secured to the crib device 10 by screws 58. The thickness of the bottom 24 of the crib device and the height of the opening 67 of the chassis are such that the outer surfaces of the lowest most components of the printed circuit board of the hard drive are prevented from contacting the floor 65 of the chassis. During this phase, the handle 40 is used to carry the drive with the handle in its vertical position, as shown in FIGS. 7 and 8A. In this position, the two cam elements 54 assume the laid back positions so that they can pass unrestrictedly into the openings 76 of the walls 66A and B of the chassis 60. When lowering the crib device, the support and retention members 26 will be received by the openings 74 and 78 and come to rest on the surfaces 86 of the chassis directly in front of and in proper registry with the two sets of lower recesses 80 thereof associated with the openings 74 and 78.

As shown in FIG. 7 and indicated above, the cam 54 constitutes a rotatable segment of a disk having two distinct cam surfaces 56.

The crib device 10 will be guided and held in the proper position during its downward movement by the fact that the brackets 28 arranged at the front of the crib device will slide over the overlapped portions of the walls 66A and B, of the chassis 60, in which the walls 20 of the crib device will be held between the brackets 28 and the walls 66A and B. As noted above, the brackets 28 not only control the downward movement of the crib device but also its longitudinal movement. In this regard, it will be observed that in all three positions represented by FIGS. 8B, C and D the brackets 28 are always in an overlapping condition relative to the walls 66A and B of the chassis 60.

During the downward movement of the crib device 10, the four fingers 36 will engage and be deflected inwardly as they contact the inside surfaces of the chassis walls 66A and B, thus preventing transverse movement of the crib device and the secured hard drive. After this very simple and quick operation, the handle 40 can be rotated from its carrying vertical position clockwise, as one views FIGS. 7 and 8B and 8C, to the position it is shown to assume in FIGS. 8C and D. This action will cause the forward most cam surfaces 56 of the cam elements 54 to contact the wall surfaces 84 of the walls 66A and B forcing the crib device and hard drive to the left on one views FIGS. 7 and 8. This movement will require very little force which may be applied by a single finger.

The controlled restraining of the crib device by virtue of the edges 86, the recesses 80, the brackets 28 and fingers 36 will assure unhesitated entrance of the connector 71 of the hard drive with the connector 69 of the computer system. In the connected position, the latch 48 of the handle 40 will pass into the latch opening 34 of the box 12, latching the crib device and the hard drive in the chassis 60, and firmly holding these interconnected units against any movement relative to the chassis, due to the locking of the cam elements 54 against the surfaces 84 of the chassis and the restraining action of the fingers 36. Also in this position, the circular recesses 49 of the arms 42 will pass over the adjacent support members 26.

Figure 8C:
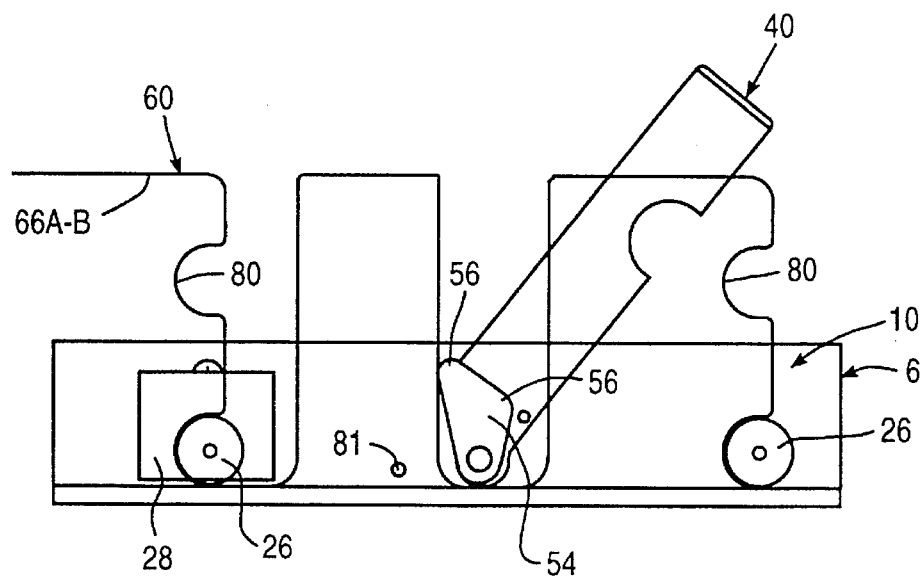
Figure 8D:
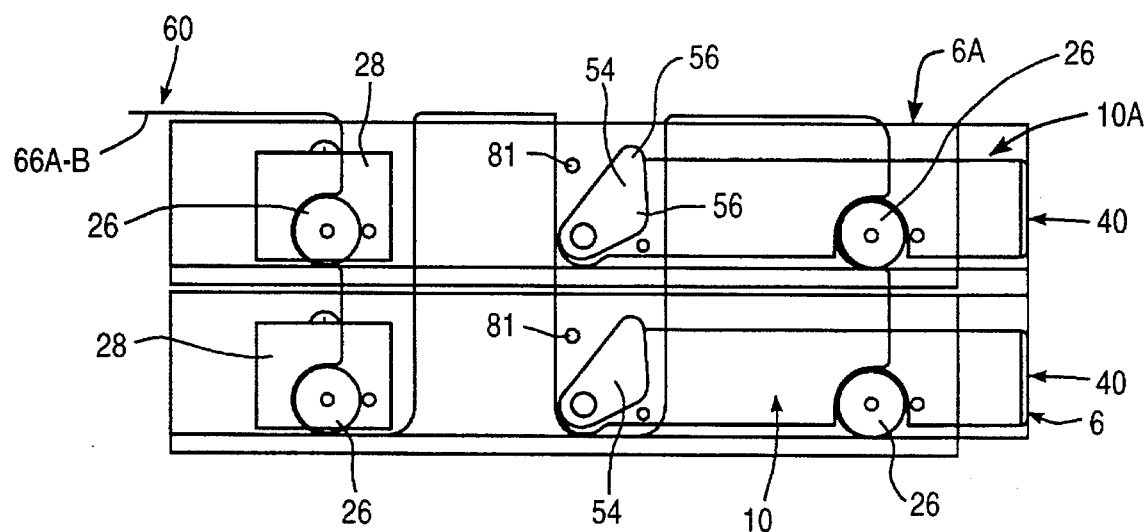

In removing the hard drive and crib device, the above procedure is reversed. In this case, the frontward most cam surfaces 56 will engage the vertical surfaces 82 of the openings 76 as the handle is rotated counterclockwise, by the same small force required to engage the connectors, as shown in FIG. 8C, for example. This will create the necessary force to disengage the connectors 69 and 71 and retract the crib device 10 and hard drive 70 to the position shown in FIG. 8B, where the handle can be used to quickly and easily lift the drive out of the chassis 60. While the above description contemplates employment of the crib device 10 to both install and remove a drive, the crib device may in certain applications be employed only to effect the installation of the drive.

In the applications where it is desirable to employ two or more hard drives in the computer system, the design illustrated in FIGS. 7 and 8 will accommodate this interest. In these figures the heights of the walls 66A and B of the chassis 60, and openings 74, 76 and 78, as well as providing second sets of recesses 80 and extended cam surfaces 82 and 84 allow a second hard drive 6A to be stacked and supported above a first drive 6. In this construction, the four feet 39 of the second crib device 10A will come to rest on the upper edges of the walls 20 of the lower crib device 10 and act as sliding surfaces for the upper crib device 10A and its drive 6A, and also provide the air flow cooling advantage, noted above, by virtue of the separation between the two crib devices. The upper surfaces or edges of the walls 20 of the lower crib device 10 provide straight continuous supporting and guiding surfaces for the feet 39 of the upper crib device 10A. The walls 20 and hence the feet 39 being located inside the walls 66A and B of the chassis 60 allow the feet of the upper crib device 10A to ride over the walls 20 of the lower crib device 10.

In accordance with the provisions of the patent statutes, we have explained our invention in terms of its preferred embodiment, however, it will be readily understood by those skilled in the art to which the invention pertains that it may be practiced otherwise than illustrated and described.

We claim:

1. A system for a computer comprising:

an element insertable in said system, a crib device having a fastening facility for allowing the element to be secured to said crib device to prevent relative movement therebetween, said crib device having a length corresponding generally to the length of the element and having opposed ends, an actuator connected to said fastening facility in a manner to allow said actuator to move from a carrying position to another position to thereby create movement of said crib device and the secured element, said actuator having an inverted U shaped handle mounted between said opposed ends, said actuator having a first cooperative part of a mechanical mechanism for effecting said movement;

a chassis having a connecting portion to allow said crib device and the secured element to be connected to said chassis, and said chassis having a second cooperative part of said mechanical mechanism operative with said first part for effecting said movement of said crib device.

2. A system according to claim 1, wherein said fastening facility is constructed to allow said actuator to move from said carrying position to two other positions.

3. A system according to claim 2, wherein said connecting portion of said crib device comprises a supporting portion, including at least two upright walls for retaining corresponding sides of the element, said connecting portion of said chassis having walls arranged to correspond generally to said walls of said crib device and separated therefrom to allow said crib device and the secured element to be received between said chassis walls, said first cooperative part of said mechanical mechanism of said actuator comprising a first cooperative part of a cam mechanism, and said second cooperative part of said mechanical mechanism of said chassis comprising a second cooperative part of said cam mechanism.

4. A system according to claim 3, wherein said first part of said cam mechanism includes two cam surfaces, said chassis walls having openings for receiving said actuator when said actuator is in said carrying position, at least one of said chassis openings forming said second part of said cam mechanism arranged to be engaged by said two cam surfaces, and wherein said one chassis opening has a width and said two cam surfaces are spaced relative to each other, such that on movement of said actuator in one direction to one of said two other positions one of said cam surfaces is caused to engage one side of said one chassis opening, and on movement of said actuator in a second direction to the other of said two positions said other cam surface is caused to engage a second side of said one chassis opening.

5. A system according to claim 3, wherein said fastening facility and said actuator are made out of a polymer.

6. A system according to claim 3, wherein said fastening facility and said actuator are made out of an aluminum alloy.

7. A system according to claim 3, wherein said supporting portion has feet members on its outside bottom surface constructed and arranged to permit said crib device to slide on contactable surfaces and allow cooling of the inserting element.

8. A system according to claim 3, wherein said supporting portion has a floor member including an opening, said chassis having a floor member including an opening, and said openings of said supporting portion and said chassis constructed to permit cooling of the inserting element.

9. A system according to claim 3, wherein said system includes a motherboard, CPU unit, one or more memory units, power supply unit and input and output units and the inserting element comprises a hard drive.

10. A crib device for receiving an insertable element of a computer comprising:

said crib device having a fastening facility for allowing the element to be secured to said crib device to prevent relative movement therebetween, said crib device having a length and having opposed ends, an actuator connected to said fastening facility in a manner to allow said actuator to move from a carrying position to another position to thereby create movement of said crib device and the element, said actuator having an inverted U shaped handle mounted between said opposed ends, and said actuator having a mechanical mechanism for effecting said movement.

11. A crib device according to claim 10, wherein said fastening facility is constructed to allow said actuator to move from said carrying position to two other positions.

12. A crib device according to claim 11, wherein said fastening facility includes a bottom portion having at least two upright walls arranged opposed to each other for retaining corresponding sides of the element.

13. A crib device according to claim 12, wherein said handle comprises a latch, said bottom portion having an opening for receiving said latch for effecting a latching of said handle, and supporting and holding members mounted on said upright walls.

14. A crib device according to claim 13, at least two of said supporting and holding members arranged opposed to each other at the end of said bottom portion opposite said latch opening, and brackets carried by said upright walls arranged adjacent to said two of said supporting and holding members for guiding and withstraining movement of said crib device.

15. A crib device according to claim 14, wherein two additional said supporting and holding members are arranged opposed to each other at the end of said bottom portion having said latch opening.

16. A crib device according to claim 12, said upright walls having outer exposed surfaces, and said upright walls having compressible fingers having surfaces that project outwardly from said outer surfaces of said upright walls.

17. A crib device according to claim 12, wherein said fastening facility and said actuator are made out of a polymer.

18. A crib device according to claim 12, wherein said fastening facility and said actuator are made out of an aluminum alloy.

19. A method of producing a crib device for receiving a drive unit, the steps of:
   forming said crib device to have a length corresponding generally to the length of said drive unit and to have opposed ends,
   forming a fastening facility on said crib device for allowing the drive unit to be secured to said crib device to prevent relative movement therebetween,
   forming an actuator to have an inverted U shaped handle mounted between said opposed ends,
   connecting said actuator to said crib device in a manner to allow said actuator to move from a carrying position to another position to thereby create movement of said crib device and drive unit, and
   forming on said actuator a mechanical mechanism for effecting said movement in the form of rotatable segment of a disk having two distinct cam surfaces.

20. In a method of producing a crib device for receiving a hard drive, the steps of:
   forming a generally rectangularly shaped box like bottom portion having at least one open end and an open top,
   said bottom portion having opposed upright sides sized and dimensioned to receive the hard drive through said open top and/or said open end,
   forming a member on said bottom portion to allow the hard drive to be secured to said bottom portion,
   forming on said upright sides members that serve to support and control movement of said crib device when in its operative position,
   forming an actuator having a member that allows the actuator to be pivotally connected to said bottom portion generally midway between the ends thereof,
   forming said actuator with at least one arm.
   causing the lower end of said arm to be connected to said bottom portion outside said upright sides, and
   forming at the lower end of said arm a rotatable member having the shape of a segment of a disk having two distinct cam surfaces capable of effecting movement of said crib device in opposite directions depending on the direction of movement of said actuator.

21. A method of assembling a computer, said computer including a chassis, a crib device and a drive unit having an electrical connector, the steps of:
   forming said chassis to have a supporting portion to allow said crib device and said drive unit to be supported by said chassis.
   forming said crib device to have a fastening facility for allowing said drive unit to be secured to said crib device to prevent relative movement therebetween,
   forming said crib device to have a length corresponding generally to the length of said drive unit and to have opposed ends,
   forming said crib device to have an actuator,
   forming said actuator to have an inverted U shaped handle mounted between said opposed ends,
   securing said drive unit to said crib device,
   positioning said crib device with said secured drive unit on said supporting portion of said chassis,
   forming as an operative part of said actuator a rotatable segment of a disk having two distinct cam surfaces capable of effecting movement of said crib device, and
   causing movement of said actuator to effect movement of said cam surfaces and said drive unit to force said electrical connector of said drive unit into an operative position with said computer.

22. A method of assembling a computer system, said system including a chassis, a crib device and a drive unit having an electrical connector,
   said chassis comprising a supporting side and two opposed extending walls,
   said walls having two spaced apart elongated openings and a pair of opposed recesses in said elongated openings and a pair of opposed recesses in a first end of said chassis opposite the end having the connector of said drive unit,
   said crib device comprising a supportable side and two opposed extending walls sized and dimensioned to fit into said chassis, wherein said supporting side of said chassis supports said supportable side of said crib device, and wherein said walls of said chassis assume an adjacent relationship with the walls of said crib device,
   said crib device having supporting and holding members arranged so that different ones are receivable in said recesses of said chassis,
   said crib device having an actuator dimensioned to be received in one of said elongated openings,
   the steps of:
   securing said drive unit to said crib device and inserting said actuator and a pair of supporting and holding members into a different one of said elongated openings so that said walls of said crib device fit within said walls of said chassis and said supportable side of said crib device is supported by the supporting side of said chassis, and
   after completion of said insertion of said crib device, causing rotational movement of said actuator to effect a movement of said drive unit to force said electrical connector of the drive unit into an operative position with said computer system and by the same movement causing said supporting and holding members to be moved into said two pairs of recesses in said openings and in said first end of said chassis.

23. A method according to claim 22 the additional step of forming said crib device out of a polymer or an aluminum alloy.

24. A method according to claim 22, the additional step of employing as said drive unit a hard drive or a floppy disk drive.

25. A method according to claim 22, the additional step of including in said computer system a motherboard,, CPU unit, one or more memory units, power supply unit and input and output units.

26. A system for inserting an element into a computer
   a crib device having a fastening facility for allowing the element to be secured to said crib device to prevent relative movement therebetween,
   an actuator connected to said fastening facility in a manner to allow said actuator to move from a carrying position to two other positions to thereby create movement of said crib device and the secured element,
   said actuator having a first cooperative part of a cam mechanism,
   a chassis having a connecting portion to allow said crib device and the secured element to be connected to said chassis,
   said connecting portion comprises a supporting portion, including at least two upright walls for retaining corresponding sides of the element, said connecting portion of said chassis having walls arranged to correspond generally to said walls of said crib device and separated therefrom to allow said crib device and the secured element to be received between said chassis walls, said chassis having a second cooperative part of said cam mechanism operative with said first part for effecting said movement of said crib device, said first part of said cam mechanism includes two cam surfaces, said chassis walls having openings for receiving said actuator when said actuator is in said carrying position, at least one of said chassis openings forming said second part of said cam mechanism and arranged to be engaged by said two cam surfaces, and wherein said one chassis opening has a width and said two cam surfaces are spaced relative to each other, such that on movement of said actuator in one direction to one of said two other positions one of said cam surfaces is caused to engage one side of said one chassis opening, and on movement of said actuator in a second direction to the other of said two positions said other cam surface is caused to engage a second side of said one chassis opening.

27. A system according to claim 26, wherein the inserting element comprises a hard drive having at one of its ends an electrical connector, adapted to be connected with a cooperative electrical connector of the computer system, and wherein the leverage effect of said two cam surfaces and actuator is such that said electrical connector of said hard drive is quickly and easily connectable and disconnectable to and from the computer system, respectively, and in the disconnectable position said crib device and hard drive can be lifted out of the chassis by said actuator.

28. A system according to claim 22 said crib device having supporting and holding members mounted on said upright walls, said chassis having corresponding recesses for receiving a different one of said supporting and holding members of said crib device, said recesses including surfaces for registering the connector of the hard drive with the connector of the computer system, and the relationship between said chassis walls and said crib device walls being such so as to limit transverse movement of said crib device relative to said chassis.

29. A system according to claim 28, at least two of said supporting and holding members arranged opposed to each other, said walls of said chassis having outer exposed surfaces, and brackets carried by said upright walls of said crib device arranged adjacent to said two of said supporting and holding members and being closely positionable relative to said outer surfaces of said walls of said chassis for guiding and withstraining movement of said crib device and hard drive.

30. A system according to claim 29, said upright walls of said crib device have outer exposed surfaces and said walls of said chassis have inner exposed surfaces, and said upright walls having compressible fingers having surfaces that project outward from said outer exposed surfaces of said upright walls adapted to engage said inner surfaces of said walls of said chassis.

31. A system according to claim 30, wherein said fingers comprise opposed spaced apart pairs of members having free ends and portions that are deflectable by said walls of said chassis when said crib device is received by said chassis.

32. A system according to claim 28, wherein said walls of said chassis are provided with two sets of said recesses arranged one above the other in said one chassis opening, wherein said one chassis opening has said cam engaging surfaces for each set of recesses arranged to permit two crib devices and associated hard drives to be stacked one above the other in said chassis, and said crib devices having straight continuous support surfaces for supporting a crib device placed above it.

33. A system according to claim 28, wherein said openings of said chassis comprising elongated openings, wherein said walls of said chassis are provided with two opposed said elongated openings, said elongated openings having pairs of opposed recesses facing into said elongated openings, said elongated openings having width sufficient to permit an opposed pair of said supporting and holding members and said arms of said handle to be inserted into said elongated openings and a different one of said supporting and holding members of said pair to be received into a different one of said recesses, said crib device and said chassis having lengths such that at one end of said crib device, said crib device extends beyond the corresponding end of said chassis, and said chassis has an exposed end at said one end, said supporting and holding members comprising a second pair of supporting and holding members, and said exposed end of said chassis having a pair of said recesses arranged to receive said second pair of supporting and holding members.

34. A system according to claim 33, said handle having a latch, and said supporting portion comprises a bottom portion having an opening for receiving said latch for effecting a latching of said handle.

35. A system according to claim 26, wherein said cam surfaces are each formed on rotatable members, said rotatable members mounted on the outside of a different one of said upright walls of said crib device and adjacent to said walls of said crib device, said rotatable members having projections arranged to face said adjacent walls: and said adjacent walls of said crib device having openings arranged to receive a said projection of an associated said rotatable member.

36. A system for a computer comprising:

an element insertable in said system, a crib device having a fastening facility for allowing the element to be secured to said crib device to prevent relative movement therebetween.

an actuator connected to said fastening facility in a manner to allow said actuator to move from a carrying position to another position to thereby create movement of said crib device and the secured element, said actuator comprising a rotatable segment of a disk having two distinct cam surfaces constructed and arranged to contact said system to effect said movement of said crib device and the secured element, and a chassis having a connecting portion to allow said crib device to be connected to said chassis.

37. A system for a computer comprising:

an element insertable in said system, a crib device having a fastening facility for allowing the element to be secured to said crib device to prevent relative movement therebetween, said crib device having a length corresponding generally to the length of the element and having opposed ends, an actuator connected to said fastening facility in a manner to allow said actuator to move from a carrying position to another position to thereby create movement of said crib device and the secured element, said actuator having an inverted U shaped handle mounted between said opposed ends, said actuator comprising a rotatable segment of a disk having two distinct cam surfaces constructed and arranged to contact said system to effect said movement of said crib device and the secured element, and a chassis having a connecting portion to allow said crib device and the secured element to be connected to said chassis.

38. A crib device for receiving an insertable element of a computer comprising:

said crib device having a fastening facility for allowing the element to be secured to said crib device to prevent relative movement therebetween, an actuator connected to said fastening facility in a manner to allow said actuator to move from a carrying position to another position to thereby create movement of said crib device and the element, and said actuator having a mechanical mechanism for effecting said movement comprising a rotatable segment of a disk having two distinct cam surfaces constructed and arranged to contact the computer to effect said movement of said crib device and the secured element.

39. A crib device for receiving an insertable element of a computer comprising:

said crib device having a fastening facility for allowing the element to be secured to said crib device to prevent relative movement therebetween, said crib device having a length and having opposed ends, an actuator connected to said fastening facility in a manner to allow said actuator to move from a carrying position to another position to thereby create movement of said crib device and the element, said actuator having an inverted U shaped handle mounted between said opposed ends, said actuator having a mechanical mechanism for effecting said movement comprising a rotatable member in the shape of a segment of a disk having two distinct cam surfaces constructed and arranged to contact the computer to effect said movement of said crib device and the secured element.

40. A method of assembling a computer system, said system including a chassis, a crib device and a drive unit having an electrical connector, said chassis comprising a supporting side and two opposed extending walls, said walls having two spaced apart elongated openings and a pair of opposed recesses in said elongated openings, said crib device comprising a supportable side and two opposed extending walls sized and dimensioned to fit into said chassis, wherein said supporting side of said chassis supports said supportable side of said crib device, and wherein said walls of said chassis assume an adjacent relationship with the walls of said crib device, said crib device having supporting and holding members arranged so that different ones are receivable in said recesses of said chassis, said crib device having an actuator dimensioned to be received in one of said elongated openings, the steps of:

securing said drive unit to said crib device and inserting said actuator into said elongated openings, and a pair of supporting and holding members into a different one of said elongated openings so that said walls of said crib device fit within said walls of said chassis and said supportable side of said crib device is supported by said supporting side of said chassis, and after completion of said insertion of said crib device, causing rotational movement of said actuator to effect a movement of said drive unit to force said electrical connector of said drive unit into an operative position with said computer system and by the same movement causing said supporting and holding members to be moved into said pair of recesses in said openings.

* * * * *